Patented Nov. 9, 1926.

1,606,338

UNITED STATES PATENT OFFICE.

LINN BRADLEY, OF MONTCLAIR, NEW JERSEY, AND EDWARD P. McKEEFE, OF NEW YORK, N. Y., ASSIGNORS TO BRADLEY-McKEEFE CORPORATION, OF NEW YORK, N. Y., A CORPORATION OF NEW YORK.

TREATMENT OF BLACK LIQUOR.

No Drawing.     Application filed May 19, 1921. Serial No. 470,963.

This invention relates to the treatment of the residual liquors from the soda pulp process, commonly known as black liquor, for the recovery therefrom of valuable products.

In the soda pulp process, the chipped wood is subjected to digestion with caustic soda of a strength of about 10.5 to 11.5 Bé., and containing about 92% of the soda as caustic soda (the remainder being sodium carbonate). About 900 gallons of the caustic soda solution are used per cord of wood (measured before chipping), and the digester is heated by direct steam at a pressure which varies from about 90 to 140 pounds, and for a suitable period of time, for example, from 3½ to 5 hours. The liquor is circulated within the digester by the steam during the digestion or cooking. The strength of the liquor and the time of treatment will vary somewhat according to the kind, quality and condition of the wood treated. The caustic soda solution used in the cooking operation is commonly made from soda ash by causticizing a solution thereof with lime. The digester is "blown" at the end of the cook and the pulp is separated from the black liquor and is washed with water. The black liquor separated from the pulp is commonly mixed with a certain amount of the wash water and the mixture constitutes what is commonly referred to as black liquor.

During the digestion in the soda pulp process a very considerable amount of the materials of the wood is dissolved so that the black liquor contains a considerable amount of organic matter in solution, and various sodium compounds. The black liquor thus commonly carries about 11 to 11½ grams of solids per 100 cc., and the total soda in the liquor is equal to about 5.75 percent of sodium carbonate, this determination being made by permitting 100 cc. of the liquor to dry and igniting the residue, burning off the organic matter and leaving the sodium carbonate.

The common method of treating the black liquor has been to evaporate a part of the water in evaporators and then feed the concentrated black liquor into an incinerator, the common type being a rotary furnace. The black liquor is further concentrated in the rotary furnace and finally burned, the organic matter being decomposed, and the inorganic matter being concentrated in the black ash, particularly in the form of sodium carbonate. The black ash is then treated with water to dissolve the sodium compounds away from the insoluble residue of carbon, etc., and the resulting solution, after suitable clarification, and after the addition of a further amount of soda ash, to make up for losses which are usual in the soda process (amounting to as much as 15%), is causticized with lime. The soda is thus converted, as far as is practicable, into sodium hydroxide or caustic soda. The lime mud is allowed to settle and the clarified solution of caustic soda is drawn off to be used in the digester. The lime mud is wasted, together with a small percentage of sodium compounds. The organic constituents of the black liquor are consumed or carbonized in the rotary furnace. The only constituents of the black liquor which are commonly recovered are the sodium compounds, the organic constituents of the liquor being lost, together with a small part of the sodium compounds.

The presence of acetates, etc., in the black liquor has been reported, but so far as we have been able to ascertain no practical method for their recovery has been proposed.

According to the present invention, valuable constituents, other than the soda, are recovered, while the soda is itself recovered for reuse in the pulp mill in a simple and advantageous manner.

The black liquors which are treated, according to the present invention, are such as are produced in the soda pulp process above described, although other black liquors of similar properties can also be treated. These black liquors generally contain some uncombined sodium hydroxide, together with sodium carbonate and compounds of sodium and organic materials, and also some fermentable sugars.

In treating the black liquor, according to the present invention, we subject it preferably while still hot from the digester, to a combined concentrating and carbonating operation in order to remove a part of the water therefrom and to precipitate most of the precipitable organic matter therefrom. The treatment of the black liquor with carbon dioxide results in the conversion of the free caustic soda of the liquor into sodium carbonate or bicarbonate and the precipitation of most of the precipitable organic matter from the solution, while the sodium of the sodium organic compounds, from which the organic matter is set free and precipitated, is also combined with the carbon dioxide to form sodium carbonate or bicarbonate. The soda of the black liquor will thus be, for the most part, converted into sodium carbonate or bicarbonate, while the greater part of the precipitable organic matter will be precipitated from the liquor.

By combining this carbonating treatment with the concentration of the liquor, we produce directly a concentrated liquor from which the precipitable organic matter has been precipitated and in which the soda is largely present in a causticizible form, such that the solution can be directly causticized to give a concentrated caustic solution. Any objectionable bicarbonate can be broken up by heat treatment.

In carrying out the combined concentration and carbonating operation of the present invention, we spray or atomize or shower the liquor into an atmosphere of hot flue gases or otherwise subject to the action thereof, or other heated gases containing carbon dioxide, either with or without preliminary partial concentration by any other means, so that a partial evaporation of the water of the liquor will take place simultaneously with the action of the carbon dioxide upon the liquor, with resulting carbonation of the soda and precipitation of organic matter and the production of a concentrated carbonated liquor from which organic matter has been precipitated.

The concentration of ordinary black liquor, containing its organic matter in solution, presents considerable difficulty, due to objectionable foaming, so that the evaporation of the liquor in ordinary evaporators can be carried only to a limited degree of concentration. The improved concentrating process of the present invention brings about the concentration of the black liquor with less difficulties due to foaming, while this concentrating operation can, moreover, be carried out with waste heat, such as that of hot flue gases or hot products of combustion into which the liquor is atomized or sprayed or showered, or otherwise subjected to the action thereof. The process is thus one of marked economy, utilizing waste heat in a simple and advantageous manner, while the concentrating operation is carried out simultaneously with the carbonation of the liquor and precipitation of the precipitable organic matter therefrom. This carbonating operation also makes use of waste gases, namely, the flue gases or products of combustion which contain ample carbon dioxide for precipitating organic matter and converting the corresponding reactive sodium compounds of the liquor into sodium carbonate or bicarbonate.

Various kinds of apparatus are available for the practice of the improved process of the present invention. The black liquor can thus be pumped to the top of a carbonating tower, by a suitable pump, and atomized into the tower with a blast of gas or air, or flue gases containing carbon dioxide, or discharged against a splash device for breaking up the liquor into a finely divided state; or the liquor can be forced through a perforated spray nozzle or through a series of small inlet pipes or passages through which the liquor is discharged in small streams which break up into drops or droplets. The atomized liquor, e. g., in the form of a rain or mist, will fall through the heated gases of the carbonating tower or chamber and will be brought into intimate contact with the heated gases, with resulting evaporation of part of the water of the liquor and reaction of the carbon dioxide of the gases with the liquor in the manner above described. The heated gases may be taken directly from the furnace or combustion chamber in which they are produced, and advantage thus taken of the high temperature which they then possess. If the gases are not available at a sufficiently high temperature, they can be further heated to promote the concentration of the liquor. The concentrated liquor will collect at the bottom of the carbonating tower or chamber, and, if it has not been sufficiently concentrated and carbonated, can be recirculated and reintroduced into the carbonating tower or chamber, or can be introduced into a different carbonating tower or chamber where it will undergo further carbonation and concentration. A series of towers or chambers may thus be provided into which the liquor is sprayed or atomized successively and in which the concentration and carbonation progressively take place. The liquor can thus be brought to the desired degree of concentration, and substantially all of the precipitable organic matter precipitated therefrom, with conversion of practically all of the corresponding reactive soda of the liquor into the form of sodium carbonate or bicarbonate, such that the liquor can be directly causticized with lime, after the separation of precipitated organic matter, to give a concentrated and causticized liquor available for reuse, with such additions thereto of caustic soda, or of soda ash or other causticizible sodium salt before causticizing, to make up for losses and supply sufficient caustic soda for further use.

The organic matter precipitated from the liquor can be removed by filtration, sedimentation, screening, or other suitable means, and forms one of the valuable products of the process. It can be washed to remove at least in part admixed and adhering sodium salts and mother liquor, and the wash water mixed with the concentrated liquor from which the organic matter has been precipitated, or with further amounts of black liquor which are to undergo concentration and carbonation, so that the excess water of the wash water will be removed during such further concentrating operation. The organic matter can be dried and used for various purposes, or it can be subjected to destructive distillation, giving valuable gaseous and liquid products, and a residue of high grade charcoal, practically ash-free.

The liquor from which the organic matter has been precipitated will be a concentrated liquor, the degree of concentration of which can be regulated. It may thus be concentrated to such a degree as will correspond with that required in the digester, so that, after causticizing, it can be directly returned to the digester; or the solution can be still further concentrated to give a more concentrated liquor, and diluted with some of the wash water from the washing of the precipitated organic matter. A further small amount of soda ash or sodium carbonate can be added to the liquor before causticizing, to make up for losses, or caustic soda can be added to the liquor for this purpose after the liquor has been causticized.

Instead of using an atmosphere of carbon dioxide for the concentration and carbonation of the black liquor, a heated atmosphere containing sulfur dioxide may be similarly used, to bring about simultaneous concentration of the liquor and combination of sulfur dioxide with some of the sodium therein. The sulfur dioxide will combine with the free caustic soda of the liquor and will decompose a large portion of the sodium organic compounds and precipitate most of the precipitable organic matter therefrom, forming sodium sulfite, or bisulfite or a mixture of both from the corresponding reactive sodium compounds of the liquor. The precipitated organic matter, of a more or less resinous character, can be separated from the concentrated sulfite or bisulfite liquor thus produced, leaving a concentrated liquor containing the sodium sulfite or bisulfite or both in solution. This liquor can be causticized with lime at least in part in much the same manner as the carbonated liquor, to give a concentrated caustic soda solution for reuse. If insufficient lime is used for completely causticizing the liquor, the resulting solution will contain a mixture of caustic soda and sodium sulfite which can be used in the digester, thus securing the combined advantages of these reagents. If desired the sodium sulphite or bisulphite may be crystallized out of the solution upon cooling the concentrated and hot liquor and sodium sulphite or bisulphite thus separated from objectionable organic materials. These crystals may be dissolved and then treated with lime to produce normal sodium sulphite or even a mixture of sodium suphite and caustic soda. The calcium sulfite produced by the causticizing operation can be treated for the regeneration of sulfur dioxide therefrom, for example, with sulfuric acid or nitre-cake (acid sodium sulfate), and the sulfur dioxide set free can be used over again in the process. If nitre-cake is used for treating the calcium sulfite, sodium sulfite may be produced in solution in addition to the sulfur dioxide, and this sodium sulfite solution can be added to the concentrated liquor before causticizing for the purpose of supplying soda and sulphite to make up for losses in the process, or for the purpose of giving an increased amount of caustic soda upon causticizing.

The black liquor often contains a considerable amount of sodium acetate etc. We have found that the amount of sodium acetate is such that it can be profitably and advantageously recovered without preventing the subsequent reuse of the causticized liquor for carrying out further digestion of the wood chips. We have found that if the causticized liquor is sufficiently concentrated, and sufficient sodium acetate etc. is present sodium acetate etc., will, to a considerable extent, crystallize out from the liquor on cooling, and can thus be recovered in a crystalline state. Such amounts of sodium acetate etc., as are not crystallized out will remain in the liquor and will be returned to the digester. So also, if the concentration of the caustic liquor is not carried sufficiently far to cause separation of the sodium acetate, etc. it will remain in the causticized liquor and will be returned to the digester, unless it has been otherwise removed.

If the sodium acetate etc. is not produced in sufficient amount during one digestion to make it profitable to recover it from the black liquor, it can be returned with the concentrated and causticized liquor to the digester and permitted to build up in this way, by returning the liquor one or more times, until there is enough sodium acetate etc., in the black liquor produced by the subsequent operation to make it profitable to separate it, or to separate out the excess of the sodium acetate etc. That is, the sodium acetate etc., can be permitted to remain in the liquor returned to the digester, and the liquor treated for the recovery of sodium acetate etc. only after an accumulation thereof has taken place during two or more digestion operations. The black liquor can thus be freed from considerable portion of its organic matter and concentrated and causticized and returned to the digester, and the liquor from the operation in which such return liquor is used can be treated for the removal or separation of sodium acetate etc. from the cycle, or can be again returned to the digester and the liquor produced from a subsequent operation treated for this purpose, depending upon the amount of sodium acetate etc. which the original liquor and the successive liquors contain. In so far as the sodium acetate etc. undergoes change in the digester, for example, to sodium oxalate or other causticizible soda compound, the treatment of the modified or changed black liquor with lime will reconvert such compounds into caustic soda which is thus made available in the further carrying out of the soda pulp process, or for other purposes.

It will thus be seen that the present invention involves a simple and advantageous method of treating black liquor, for the recovery of various valuable products therefrom, in which the liquor is subjected to a combined concentration and carbonation or sulfitation, with precipitation of organic matter and conversion of the reactive sodium compounds of the liquor into a causticizible form (i. e., sodium carbonate or bicarbonate or sodium sulfite or bisulfite); so that a concentrated liquor will be directly produced, from which most of the precipitable organic matter has been precipitated, and which can be causticized (after the separation of the precipitated organic matter) to give a concentrated caustic soda solution available for reuse. If desired the bicarbonate or bisulphite may be broken up by heat treatment to liberate uncombined acid and thus reduce the amount of lime required for causticizing. The free $CO_2$ or $SO_2$ may be used again in the cycle. It will also be seen that the invention enables valuable organic compounds, such as acetates etc., to be recovered therefrom.

While we have described the invention in connection with the treatment of black liquor from the soda pulp process, with particular reference to the process in which caustic soda is employed for the treatment of poplar and other woods, yet the invention is also applicable to the treatment of black liquor produced by the sodium sulfate process, so-called, especially as such liquor also commonly contains notable amounts of soda in the form of caustic soda, sodium organic compounds, causticizible sodium salts, etc., and inasmuch as part of the organic matter can be similarly precipitated from such black liquor in a similar manner to that hereinbefore described. Such sodium salts or compounds as are not causticizible, and as are not crystallized out or precipitated from the liquor due to concentration, will remain with the liquor and be returned to the digester. Instead of causticizing the sodium carbonate or bicarbonate or sulphite or bisulphite remaining in the liquor after the carbonation or sulphitation and removal of precipitated material, we may in some cases recover sodium carbonate or bicarbonate, sulphite or bisulphite as such.

Cellulosic materials other than wood may be treated and the residual liquor subjected to operations similar to those described for residual liquors resulting from cooking wood chips.

In the claims the term black liquor is intended to cover all residual liquors, resulting from the cooking of cellulose bearing materials, which contain uncombined alkali metal hydroxide.

We claim:

1. The method of treating black liquor, which comprises simultaneously concentrating the liquor and precipitating organic matter therefrom by bringing the liquor into contact with hot gases containing a reagent capable of precipitating organic matter.

2. The method of treating black liquor, which comprises simultaneously concentrating the liquor and precipitating organic matter therefrom by bringing a continuous stream of the liquor into contact with hot gases containing a reagent capable of precipitating organic matter.

3. The method of treating black liquor, which comprises substantially concentrating the liquor by spraying the liquor into a current of a gaseous mixture containing carbon dioxide and thereby simultaneously evaporating water from and carbonating the liquor.

4. The method of treating black liquor, which comprises atomizing or spraying or showering the liquor into a heated atmosphere containing a reagent which will precipitate organic matter from the liquor, whereby the liquor is simultaneously concentrated and organic matter precipitated therefrom.

5. The method of treating black liquor, which comprises spraying the liquor into a current of a gaseous mixture containing carbon dioxide and simultaneously evaporating a substantial amount of water from and carbonating the liquor, separating the precipitated matter and causticizing the resulting liquor by treatment with an alkaline earth hydroxide.

6. The method of treating black liquor, which comprises atomizing or spraying or showering the same into a heated atmosphere containing a gaseous acid forming oxide, capable of forming causticizible sodium salts thereby simultaneously concentrating the liquor and precipitating organic matter therefrom and producing a solution of sodium salts causticizible with lime, and subjecting the resulting concentrated liquor to causticizing to give a concentrated caustic soda solution available for reuse.

7. The method of treating black liquor, which comprises simultaneously concentrating the liquor and precipitating organic matter therefrom, causticizing the resulting liquor, and concentrating the same to separate sodium acetate therefrom.

8. The method of treating black liquor, which comprises simultaneously concentrating the liquor and precipitating organic matter therefrom, by bringing the liquor into contact with hot gases containing a reagent capable of precipitating organic matter, and treating the resulting liquor for the production of caustic soda in solution.

9. The method of treating black liquor, which comprises simultaneously concentrating the same and precipitating organic matter therefrom, by bringing the liquor into contact with hot gases containing a reagent capable of precipitating organic matter, washing the precipitated organic matter, and combining the wash water with black liquor to be concentrated, whereby the wash water is concentrated simultaneously with the black liquor.

10. The method of treating black liquor, which comprises simultaneously concentrating the liquor and precipitating organic matter therefrom, by bringing the liquor into contact with hot gases containing a reagent capable of precipitating organic matter, adding to the concentrated liquor a causticizible sodium compound to make up for losses of soda and causticizing the resulting liquor for reuse.

In testimony whereof we affix our signatures.

LINN BRADLEY.
EDWARD P. McKEEFE.